United States Patent

[11] 3,574,423

[72] Inventor John Stevenson Thomson
    104 Forsyth St., Greenock, Scotland
[21] Appl. No. 822,061
[22] Filed May 5, 1969
[45] Patented Apr. 13, 1971
[32] Priority May 4, 1968
[33] Great Britain
[31] 21,228/68

[54] SHEAVE WITH LUBRICANT RESERVOIR
    2 Claims, 1 Drawing Fig.
[52] U.S. Cl. .................................................. 308/18
[51] Int. Cl. .................................................. F16c 13/00
[50] Field of Search .................................... 74/230.01;
                                                    308/18; 184/59

[56] References Cited
    UNITED STATES PATENTS

| 526,013 | 9/1894 | Howard | 308/18 |
|---|---|---|---|
| 1,382,355 | 6/1921 | Greiner | 308/18 |
| 2,630,793 | 3/1953 | Best et al. | 184/59 |
| 2,926,968 | 3/1960 | Toth | 308/18 |

FOREIGN PATENTS

| 305,807 | 5/1955 | Switzerland | 74/230.01 |
|---|---|---|---|

Primary Examiner—Fred C. Mattern, Jr.
Assistant Examiner—Wesley S. Ratliff, Jr.
Attorney—Young & Thompson

ABSTRACT: A circular dished member having a grooved rim and provided with a circular cover enclosing the concavity of the dished member to form an annular reservoir for retaining a relatively large quantity of lubricant to be supplied to the centrally disposed bearing of the sheave formed by or held in position by the dished member and/or circular cover.

PATENTED APR 13 1971
3,574,423
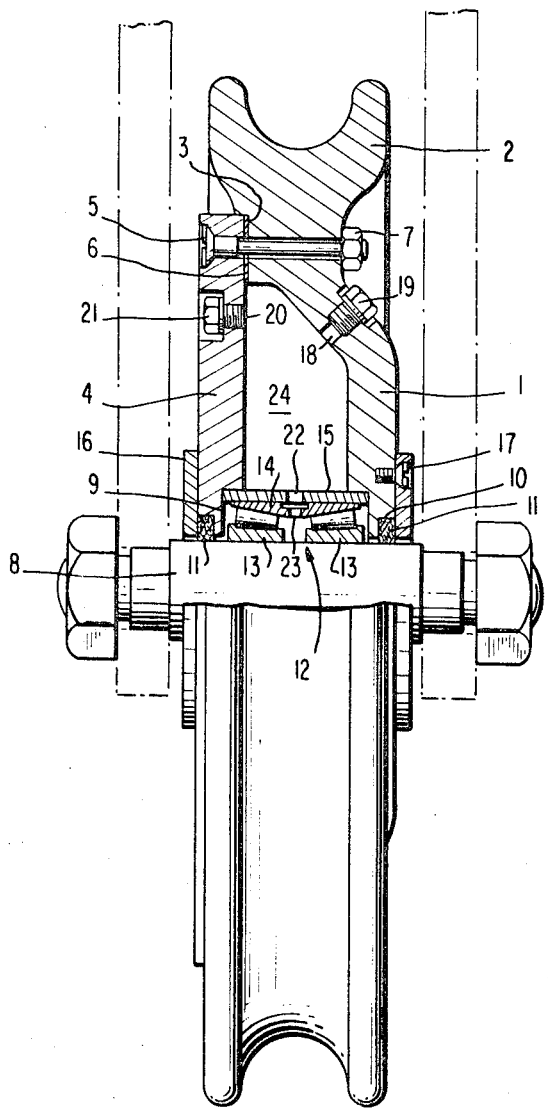
INVENTOR
JOHN S. THOMSON
BY Young & Thompson
ATTORNEYS

SHEAVE WITH LUBRICANT RESERVOIR

The present invention relates to pulley block sheaves and like pulleys and wheels (hereinafter referred to simply as sheaves) which are formed with grooved rims for engaging ropes or cables, the invention having particular reference to self-lubricating sheaves incorporating annular lubricant reservoirs which surround the bearings of the sheaves and from which lubricant is supplied to the bearings.

Known sheaves incorporating annular lubricant reservoirs as aforementioned each comprise two substantially similar concentric dished members secured together in juxtaposition to form between them the annular lubricant reservoir, the grooved rope-engaging rim, and housing means for the bearing or bearings, the sheave being provided with means for introducing lubricant to the reservoir and for supplying lubricant from the reservoir to the bearing or bearings.

Since, in the aforementioned known sheaves, the necessary fluidtight joint between the two members bisects the rope-engaging groove in the rim, there is the possibility that, with protracted action of the rope in the groove and consequent strain on the sides of the groove due, for example, to wedging of the rope therein or misalignment of the rope, leakage of lubricant past the joint will eventually result and would require periodic remedial attention.

An object of the present invention is to obviate this possibility of leakage.

According to the present invention, a sheave comprises two concentric members secured together in juxtaposition with fluidtight jointing means therebetween and with bearing means mounted therebetween centrally of the sheave, wherein one of said members is of dished formation having a grooved rim for engaging a rope or cable and the other said member is in the form of a cover enclosing the concavity of said dished member to form an annular lubricant reservoir surrounding said bearing means, means being provided for introducing lubricant to said reservoir and for supplying lubricant from said reservoir to said bearing means.

Thus, in a sheave according to the present invention, the fluidtight jointing means between the two members of the sheave is relieved of the effects of any strain which may be imposed on the sheave by the aforementioned action of the rope or cable on the grooved rim of the sheave.

The advantages of the present invention will become apparent from a consideration of the following description, taken in connection with the accompanying DRAWING, which is a part sectional view of an embodiment of a sheave according to the present invention.

Referring now to the drawing there is shown a pulley block sheave according to the present invention, comprising a main circular member 1 of outwardly convex, inwardly concave dished formation, having a peripheral grooved rim 2 about which the associated cable or rope is to be reeved. Member 1 also has an annular sealing surface 3 disposed in a plane perpendicular to the axis of the sheave and located near the rim on the concave side of member 1. A flat circular cover member 4 is secured by screws 5 to member 1 so as to be concentric with member 1; and an oiltight packing material 6 is interposed between members 1 and 4 at surface 3. Screws 5 pass through members 1 and 4 and material 6 and are equispaced about the sheave and are secured at their ends remote from member 4 by lock nuts 7.

Members 1 and 4 have central bores for the reception of the pulley block spindle 8. These bores include confronting recesses 9 on the inner sides of members 1 and 4 for locating and securing in place the bearing assembly of the sheave, and oppositely outwardly facing recesses 10 on the outer sides of members 1 and 4 for the reception of annular oil seals 11 that bear against a central support for the sheave such as the spindle 8 in oil-sealing relationship.

The bearing assembly comprises a two-row tapered roller bearing 12 of which the inner races 13 are directly mounted on the spindle 8, and the outer race 14 is secured midway within a hollow cylindrical housing 15 having its ends tightly fitting within the recesses 9.

The oil seals 11 are held in position by circular retainers 16 embracing the spindle, these being secured by screws 17, respectively, to the outer sides of the main and cover members.

An oil filler hole 18 fitted with an oiltight plug 19 is provided on the main member, on the shoulder of the dished portion thereof, nearer to the outer periphery of rim 2 than to the axis of the sheave; and an air vent hole 20 fitted with another oiltight plug 21 is provided on the cover member substantially opposite to the oil filler hole and at least as far from the axis of the sheave as is hole 18.

Oil access holes 22 and 23 are provided at spaced intervals respectively around the cylindrical housing 15 and the outer race 14 of the bearing assembly, these holes being located in line with the center of the space between the rollers of the assembly.

To fill the sheave with oil, both plugs referred to above are temporarily removed and oil is introduced through the filler hole into the annular reservoir 24 formed by the members of the sheave, while air displaced from the reservoir by the influx of oil thereinto escapes through the vent hole. Oil in the reservoir flows therefrom through the access holes 22 and 23 in the bearing assembly to the interior of the bearing and thereafter the copious supply of oil in the reservoir is sufficient to maintain the bearing in a well-lubricated state for a considerable length of time.

Although in the foregoing the sheave is described as having a roller bearing, other types of bearings, for instance ball bearings or bushed bearings, may instead be used.

Also, instead of having the separate bearing housing 15, the housing may be formed integrally with one or both sheave members.

In view of the foregoing disclosure, therefore, it will be evident that the initially recited object of the present invention has been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

I claim:

1. A sheave comprising two concentric members secured together in juxtaposition with fluidtight jointing means therebetween and with bearing means therebetween centrally of the sheave, wherein one of said members is of dished formation having a grooved rim for engaging a rope or cable and the other said member is in the form of a cover enclosing the concavity of said dished member to form an annular lubricant reservoir surrounding said bearing means, and means for introducing lubricant to said reservoir and for supplying lubricant from said reservoir to said bearing means.

2. A sheave as claimed in claim 1, wherein said cover member is secured to said dished member on the radially inner side of said grooved rim.